United States Patent
Forster et al.

[11] 3,746,138
[45] July 17, 1973

[54] ACTUATING MECHANISM FOR FRICTION CLUTCHES IN AUTOMATIC MOTOR VEHICLE TRANSMISSIONS

[75] Inventors: Hans-Joachim M. Forster, Stuttgart; Ulrich Eltze, Esslingen-Liebersbronn; Werner Hensel, Berkheim Kr. Esslingen, all of Germany

[73] Assignee: Daimler-Benz Aktiengesellschaft, Stuttgart, Germany

[22] Filed: Apr. 6, 1971

[21] Appl. No.: 131,707

[30] Foreign Application Priority Data
Apr. 8, 1970  Germany.................. P 20 16 712.8

[52] U.S. Cl............................ 192/87.11, 192/109 F
[51] Int. Cl............................................ F16d 25/10
[58] Field of Search ..................... 192/109 F, 87.11, 192/87.12, 87.13, 87.14, 87.15, 87.18, 87.19, 86

[56] References Cited
UNITED STATES PATENTS

| | | | |
|---|---|---|---|
| 3,429,410 | 2/1969 | Hansen............................ | 192/85 CA |
| 3,444,971 | 5/1969 | Davidson......................... | 192/85 CA |
| 3,243,026 | 3/1966 | Snoy et al......................... | 192/109 F |
| 3,224,539 | 12/1965 | Hensel............................. | 192/87.11 |
| 3,279,573 | 10/1966 | Hensel............................. | 192/87.11 |
| 3,612,237 | 10/1971 | Honda............................. | 192/109 F |

Primary Examiner—Benjamin W. Wyche
Attorney—Craig and Antonelli

[57] ABSTRACT

An actuating mechanism for two friction clutches, which comprises a first actuating piston for the first clutch forming at the same time the cylinder for the second actuating piston for the second clutch, whereby both actuating pistons are actuated by a pressure medium and the first actuating piston is subdivided into two partial piston sections, of which a first partial piston section actuates a first clutch and the second partial piston section is connected with the first partial piston section only in the engaging direction of the clutch while it is able to move independently of the first partial piston section in the disengaging direction.

11 Claims, 1 Drawing Figure

Patented July 17, 1973  3,746,138
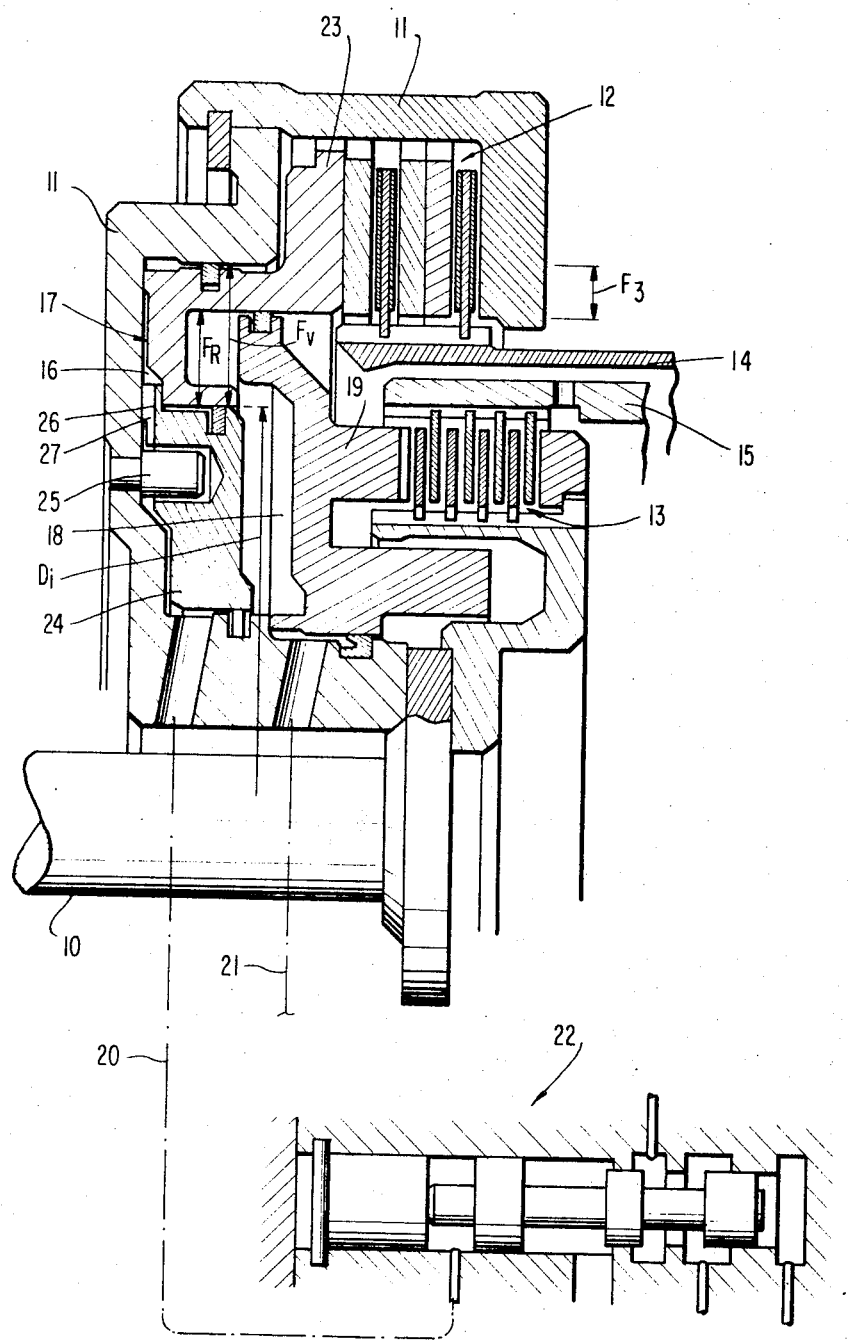
INVENTORS
HANS-JOACHIM M. FÖRSTER
ULRICH ELTZE
WERNER HENSEL
BY Craig, Antonelli, Stewart & Hill
ATTORNEYS

ACTUATING MECHANISM FOR FRICTION CLUTCHES IN AUTOMATIC MOTOR VEHICLE TRANSMISSIONS

The present invention relates to an actuating mechanism for two friction clutches, especially for two lamellae friction clutches for shifting automatic motor vehicle transmissions, with a first pressure-actuated actuating piston for the first clutch which at the same time forms the cylinder for accommodating a second pressure-actuated actuating piston for the second clutch.

Automatically shifting planetary gear change-speed transmissions are known in which the drive or input is adapted to be connected with two different transmission input members by way of two friction clutches adapted to be engaged either selectively or in unison. Thus, for example a transmission exists, in which a first clutch is engaged in the highest forward speed and in the reverse speed whereas a second clutch is engaged in all forward speeds. This means, therefore, the second clutch is operable alone in the lower forward speeds whereas in the highest forward speed, the first and second clutches operate together and the first clutch is effective alone in reverse speed.

The actuating mechanisms described above have already been proposed heretofore for that purpose. This prior art proposal is to the effect that the two actuating pistons are arranged concentrically one within the other. The two clutches can be arranged thereby also concentrically one about the other. This actuating mechanism as already proposed is advantageous as such because with the same pressures in both pressure spaces—which will be the case during normal operation—only the differential area of the two actuating pistons is effective in the highest forward speed whereas in reverse speed—when the second clutch is disengaged—the entire, relatively large piston surface of the first clutch is effective, corresponding to the considerably higher torque to be transmitted in this speed. Additionally, with this arrangement, the shifting pressure in the second clutch supplies the necessary retracting force for the disengagement of the first clutch with respect to the centrifugal oil pressure in the space of the first actuating piston.

However, this prior art arrangement entails the following disadvantages. When the first clutch is additionally engaged, the pressure in the cylinder space of this first actuating piston during the movement of the first actuating piston is with respect to the pressure in the cylinder space of the second actuating piston at the inverse ratio of the pressure-loaded surface for reasons of the force equilibrium. With a large surface of the first actuating piston—which would be desirable as such by reason of the large actuating force in the reverse speed—a pressure thus results which is reduced only slightly with respect to the pressure in the actuating cylinder of the second clutch. Consequently, a large filling volume and above all a long filling time would be necessary. Additionally, the filling pressure in the line to the actuating cylinder of the first clutch is conducted in a measuring line to the end face of a shifting slide valve which at the end of the filling of the first clutch disengages the brake of another speed with a certain overlap. This disengagement takes place in dependence on the pressure jump between the filling pressure and the full pressure at the first clutch. In order to assure a safe disengagement and therewith a shock-free shifting, this pressure jump must not become excessively small.

The present invention is concerned with the task to provide a solution to the aforementioned problems. The present invention has as its general concept that—in order to eliminate the described difficulties—the surface ratio between the front and rear side at the first actuating piston is to be as large as possible which could be achieved, for example, in that the first actuating piston is coordinated to another inner diameter than the second actuating piston. However, since this would not produce a sufficiently large surface for the transmission of the high torque in reverse speed, the present invention proposes as solution to the underlying problems that the first actuating piston is subdivided into a first and into a second partial piston whereby the first partial piston actuates the first clutch, and in that the second partial piston is connected with the first partial piston only in the engaging direction whereas it is able to move independently of the first partial piston in the disengaging direction.

The construction according to the present invention offers the advantage that the advantages of the arrangement described hereinabove which are present as such, can be preserved and that nonetheless the surface ratio at the first actuating piston can be selected as large as possible. The pressure jump between filling pressure and full pressure thereby becomes considerably greater and the corresponding shifting slide valve member is able to respond better with certainty. Consideration can additionally be given according to the present invention that the inner diameter at the first actuating piston is so large that the force exerted by the smallest pressure in the actuating cylinder of the second clutch on the counter surface is sufficient to displace the first actuating piston against the centrifugal oil pressure with maximum rotational speed.

In one embodiment of the present invention, the second partial piston is non-rotatably guided at the part accommodating the actuating pistons, for example, by means of pins which engage with play into corresponding bores at the partial piston. Furthermore, it is proposed according to the present invention that the first partial piston is arranged concentrically about the second partial piston and that the second partial piston is provided at the outer circumference with an annular flange for the axial entrainment of the first partial piston, which annular flange abuts at the end face of the first partial piston effective in the engaging direction. A further feature of the present invention resides in that the second partial piston is supported in its disengaged position by means of an annular surface on its back side at the cylinder and that this annular surface is provided with approximately radially extending grooves or the like for the passage of the pressure medium.

Accordingly, it is an object of the present invention to provide an actuating mechanism for friction clutches in automatic motor vehicle transmissions which obviates by simple means the aforementioned shortcomings and drawbacks encountered heretofore.

Another object of the present invention resides in an actuating mechanism for friction clutches of automatic transmissions which assures a safe engagement and disengagement of the various speeds without shocks or other unpleasant shifting discomforts.

A further object of the present invention resides in an actuating mechanism for friction clutches of automatic transmissions which assures a relatively large pressure jump between filling pressure and full pressure.

Still another object of the present invention resides in an actuating mechanism for clutches of transmissions which assures a reliable displacement of the first actuating piston against the centrifugal oil pressure at maximum rotational speed.

These and further objects, features, and advantages of the present invention will become more obvious from the following description when taken in connection with the accompanying drawing which shows, for purposes of illustration only, one embodiment in accordance with the present invention, and wherein:

The single FIGURE is a somewhat schematic longitudinal cross-sectional view through an actuating mechanism in accordance with the present invention which is schematically completed insofar as the shifting element thereof is concerned.

Referring now to the single FIGURE of the drawing, a drum-shaped part 11—which is constructed multipartite for assembly reasons—is driven from a drive shaft 10. A first lamellae friction clutch generally designated by reference numeral 12 is arranged in the drum-shaped part 11 concentrically about a second lamellae friction clutch generally designated by reference numeral 13. Drum-shaped parts 14 and 15 lead from the two clutches 12 and 13 to the transmission elements (not shown). The construction of the clutches as well as of the transmission itself may be of any conventional construction, forming no part of the present invention and therefore not illustrated and described in detail herein. The two clutches 12 and 13 operate during shifting in the manner described hereinabove.

The drum-shaped part 11 forms simultaneously a cylinder space 16 for the first actuating piston generally designated by reference numeral 17 of the first clutch 12. The actuating piston 17 again forms a cylinder space 18 for the second actuating piston 19 of the second clutch 13. The feed line of the pressure medium to the two cylinder spaces 16 and 18 takes place by way of lines 20 and 21 and is controlled by the conventional shifting plate on the transmission (not shown). The line 20, however, is connected with a shifting slide valve generally designated by reference numeral 22 for the reasons described above, which controls the disengagement of the brake of another speed.

The first actuating piston 17 is subdivided into a first partial piston 23 and a second partial piston 24. The latter is non-rotatably guided on pins 25 at the drum-shaped part 11. The second partial piston 24 includes outwardly thereof an annular flange 26 by means of which it is able to take along the first partial piston 23 in the engaging direction, i.e., toward the right as viewed in the drawing. In the opposite direction, the second partial piston 24 is able to move independently of the first partial piston 23. Approximately radially extending grooves 27 are provided in the annular flange 26 in order that the pressure medium is able to flow therethrough from the inside toward the outside.

If the first clutch 12 is engaged by itself in reverse speed, the entire effective piston surface $F_{17}$ thereof formed by the two partial pistons 23 and 24 is effective at the first actuating piston 17. If, in contradistinction thereto, both clutches 12 and 13 are engaged together in the third forward speed, then only the differential surface $F_3$ which results from the difference of the effective piston area at the first and at the second actuating piston, is effective at the actuating piston 17. The area ratio of the back side $F_R$ and of the front side $F_V$ of the first partial piston 23 is determinative for the aforementioned pressure jump at the shifting slide valve 22. It is obvious that this pressure jump is the larger the greater the inner diameter $D_i$ of the first partial piston 23. However, the force on the back side $F_R$ of the first partial piston 23 is again a measure for that purpose which must be sufficient in order to retract the first partial piston 23 against the centrifugal force in the cylinder space 16 also at the lowest pressure in the cylinder space 18.

While we have shown and described only one embodiment in accordance with the present invention, it is obvious that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An actuating arrangement for first and second friction clutch means comprising: a first actuating piston means for actuating the first clutch means, a second actuating piston means for actuating the second clutch means, said second actuating piston means being movably guided in a cylinder formed by said first actuating piston means, first supply means for supplying a pressure medium to force said first piston means in a direction corresponding to engagement of said first clutch means, and second supply means for supplying a pressure medium to force said second piston means in a direction corresponding to engagement of said second clutch means, said first piston means being in communication with said second supply means such that supply of said pressure medium to force said second piston means in a direction corresponding to engagement of said second clutch means simultaneously applies a force on said first piston means in a direction corresponding to disengagement of said first clutch means, wherein said first actuating piston means is subdivided into a first and a second partial piston, wherein the first partial piston is arranged for directly actuating said first clutch means, and wherein the second partial piston is operatively connected for movement with the first partial piston only in the direction corresponding to engagement of said first clutch means with the second partial piston being movable independently of the first partial piston in the direction corresponding to disengagement of said first clutch means.

2. An arrangement according to claim 1, wherein said first and second clutch means are arranged such that they are separately engageable by selective control of the respective first and second supply means and are simultaneously engageable by utilizing both said first and second supply means to simultaneously supply pressure medium to force said both piston means in their respective clutch engaging directions.

3. An arrangement according to claim 1, characterized in that the friction clutch means are lamellae friction clutches for shifting an automatic motor vehicle transmission.

4. An arrangement according to claim 1, characterized in that the second partial piston is non-rotatably guided in a part accommodating the actuating piston means.

5. An installation according to claim 1, characterized in that the first partial piston is arranged concentrically about the second partial piston, and in that the second partial piston is provided with an annular flange means at the outer circumference for the axial entrainment of the first partial piston, said annular flange means abutting against the end face of the first partial piston when said piston means is moved in the direction corresponding to engagement of said first clutch means.

6. An actuating arrangement for first and second friction clutch means comprising: a first actuating piston means for actuating the first clutch means, a pressure medium for actuating said first piston means, a second actuating piston means for actuating the second clutch means, and a pressure medium for actuating said second piston means, said first actuating piston means simultaneously forming a cylinder accommodating the second actuating piston means, said first actuating piston means being subdivided into a first and a second partial piston, the first partial piston directly actuating said first clutch means, the second partial piston being operatively connected with the first partial piston only in the clutch engaging direction with the second partial piston being able to move independently of the first partial piston in the clutch disengaging direction, wherein the second partial piston in its disengaged position is supported with an annular surface on its back side against a part forming the cylinder for the actuating means, and wherein said annular surface is provided with approximately radially extending grooves for the passage therethrough of the pressure medium in the outward direction.

7. An installation according to claim 6, characterized in that the first partial piston is arranged concentrically about the second partial piston, and in that the second partial piston is provided with an annular flange means at the outer circumference for the axial entrainment of the first partial piston, said annular flange means abutting against the end face of the first partial piston, which is effective in the engaging direction.

8. An arrangement according to claim 1, wherein said second partial piston is non-rotatably guided in a part accommodating said piston means by pin means which engage with play in corresponding bores at the second partial piston.

9. An installation according to claim 8, characterized in that the first partial piston is arranged concentrically about the second partial piston, and in that the second partial piston is provided with an annular flange means at the outer circumference for the axial entrainment of the first partial piston, said annular flange means abutting against the end face of the first partial piston when said first piston means is moved in the direction corresponding to engagement of said first clutch means.

10. An actuating arrangement for first and second friction clutch means comprising: a first actuating piston means for actuating the first clutch means, a pressure medium for actuating said first piston means, a second actuating piston means for actuating the second clutch means, and a pressure medium for actuating said second piston means, said first actuating piston means simultaneously forming a cylinder accommodating the movement of the second actuating piston means, and first actuating piston means being subdivided into a first and a second partial piston, the first partial piston directly actuating said first clutch means, the second partial piston being operatively connected with the first partial piston only in the clutch engaging direction with the second partial piston being able to move independently of the first partial piston in the clutch disengaging direction, wherein the second partial piston is non-rotatably guided in a part accommodating the actuating piston means by pin means which engage with play in corresponding bores at the second partial piston, wherein the first partial piston is arranged concentrically about the second partial piston, the second partial piston being provided with an annular flange means at the outer circumference for the axial entrainment of the first partial piston, said annular flange means abutting against the end face of the first partial piston, which is effective in the engaging direction, the second partial piston in its disengaged position being supported with an annular surface on its back side against the part forming the cylinder for the actuating means, said annular surface being provided with approximately radially extending grooves for the passage therethrough of the pressure medium in the outward direction.

11. An arrangement according to claim 9, characterized in that the friction clutch means are lamellae friction clutches for shifting an automatic motor vehicle transmission.

* * * * *